Dec. 19, 1961  T. O. MEHAN ET AL  3,013,717
ELECTROMECHANICAL CONTROLS FOR CALCULATING MACHINES
Filed Aug. 8, 1955  14 Sheets-Sheet 1

INVENTORS:
Thomas O. Mehan, Deceased,
By Laura W. Mehan, Executrix,
and Robert C. Hoffman,
By Ahlberg, Nupper & Gradolph
Attorneys Dec. 19, 1961  T. O. MEHAN ET AL  3,013,717
ELECTROMECHANICAL CONTROLS FOR CALCULATING MACHINES
Filed Aug. 8, 1955  14 Sheets-Sheet 5

INVENTORS:
Thomas O. Mehan, Deceased,
By Laura M. Mehan, Executrix,
and Robert C. Hoffman
By Ahlberg, Nupper & Gradolph
Attorneys.

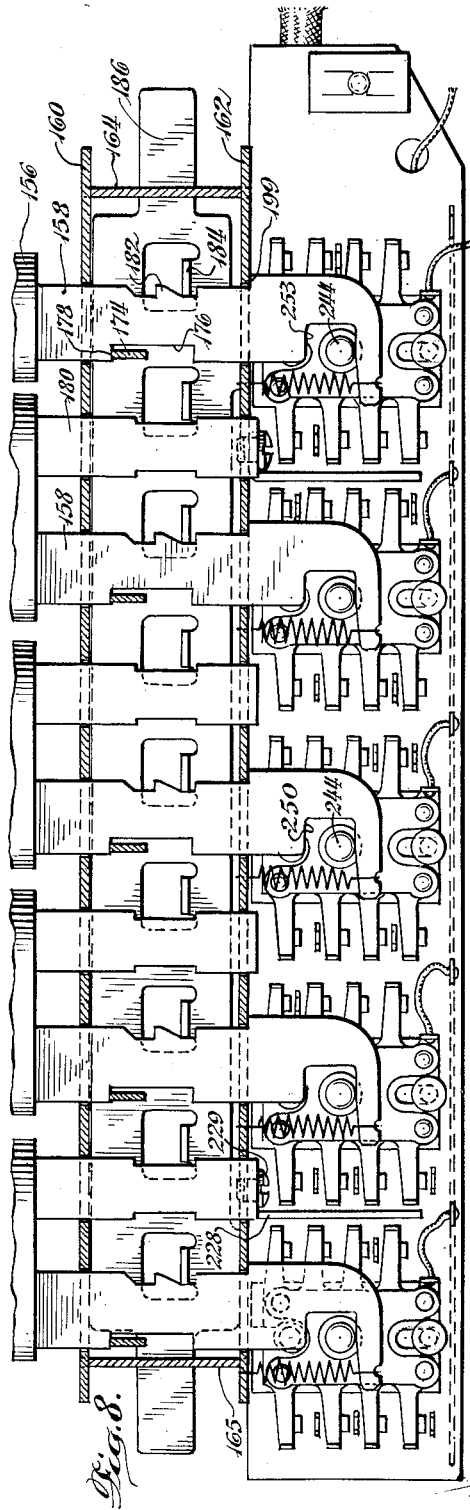
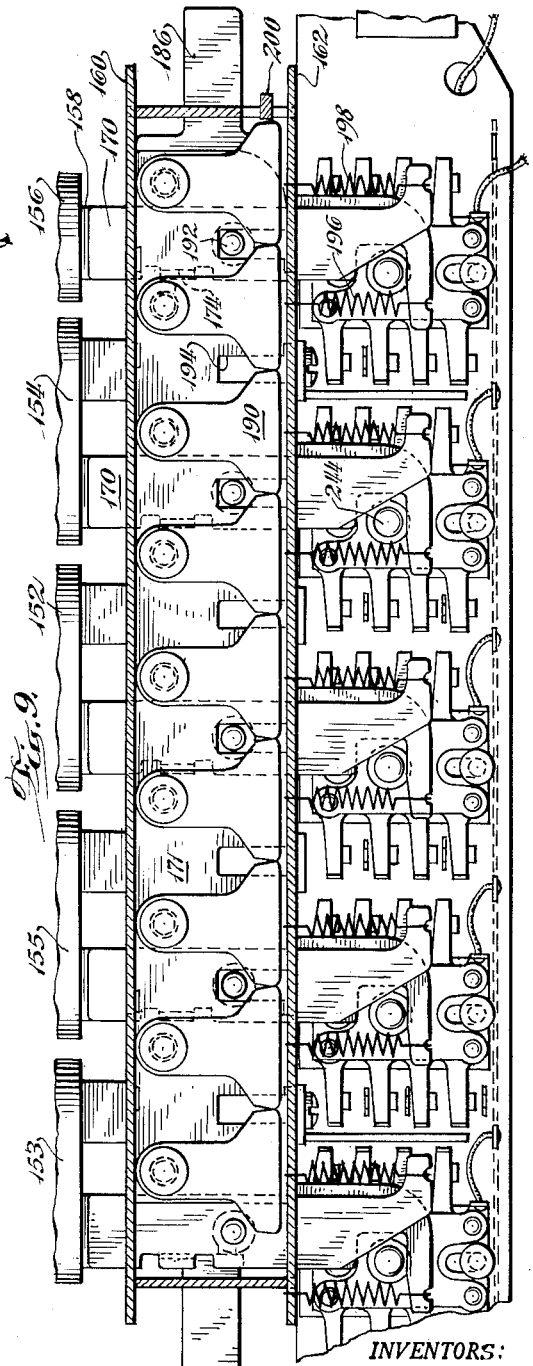

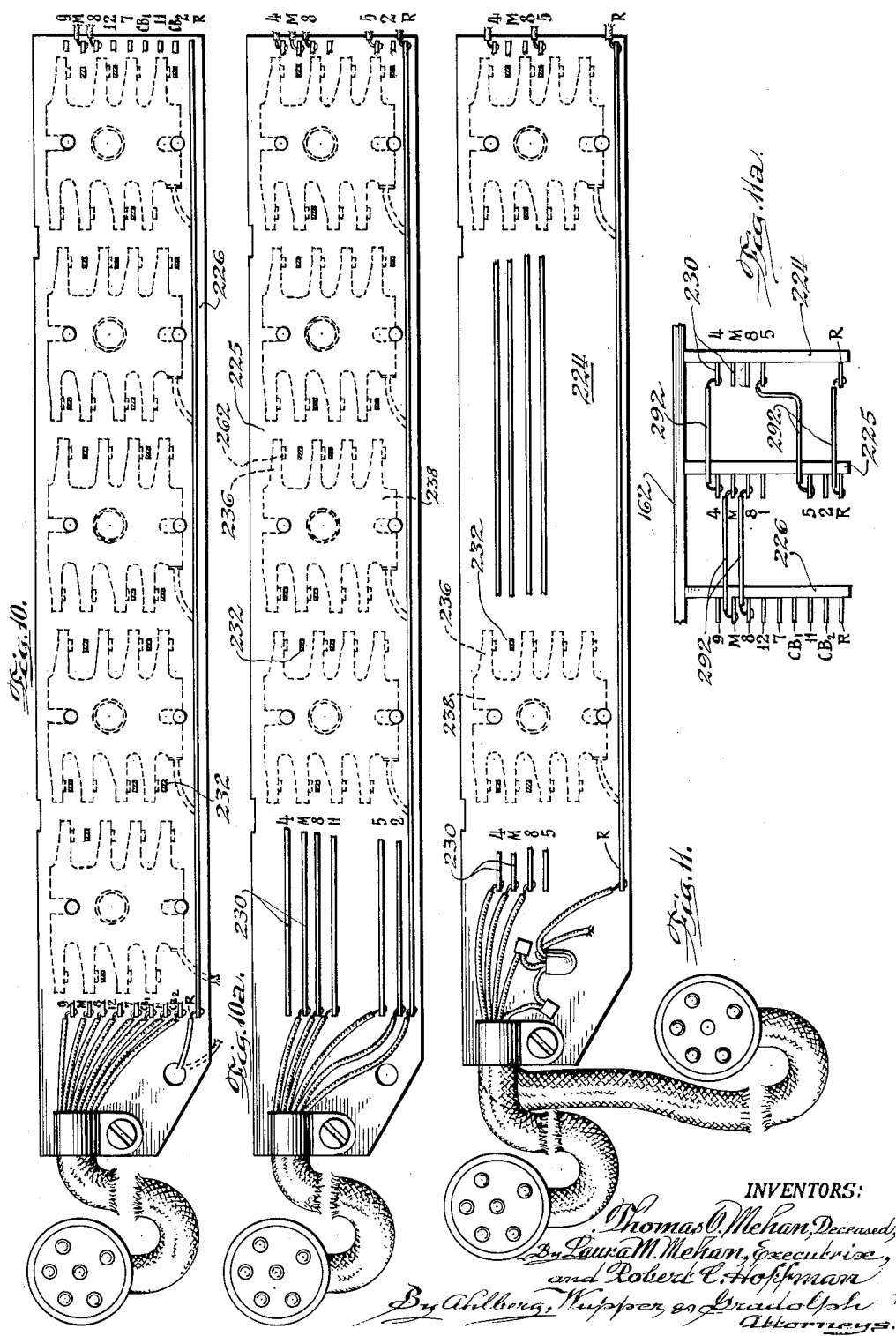

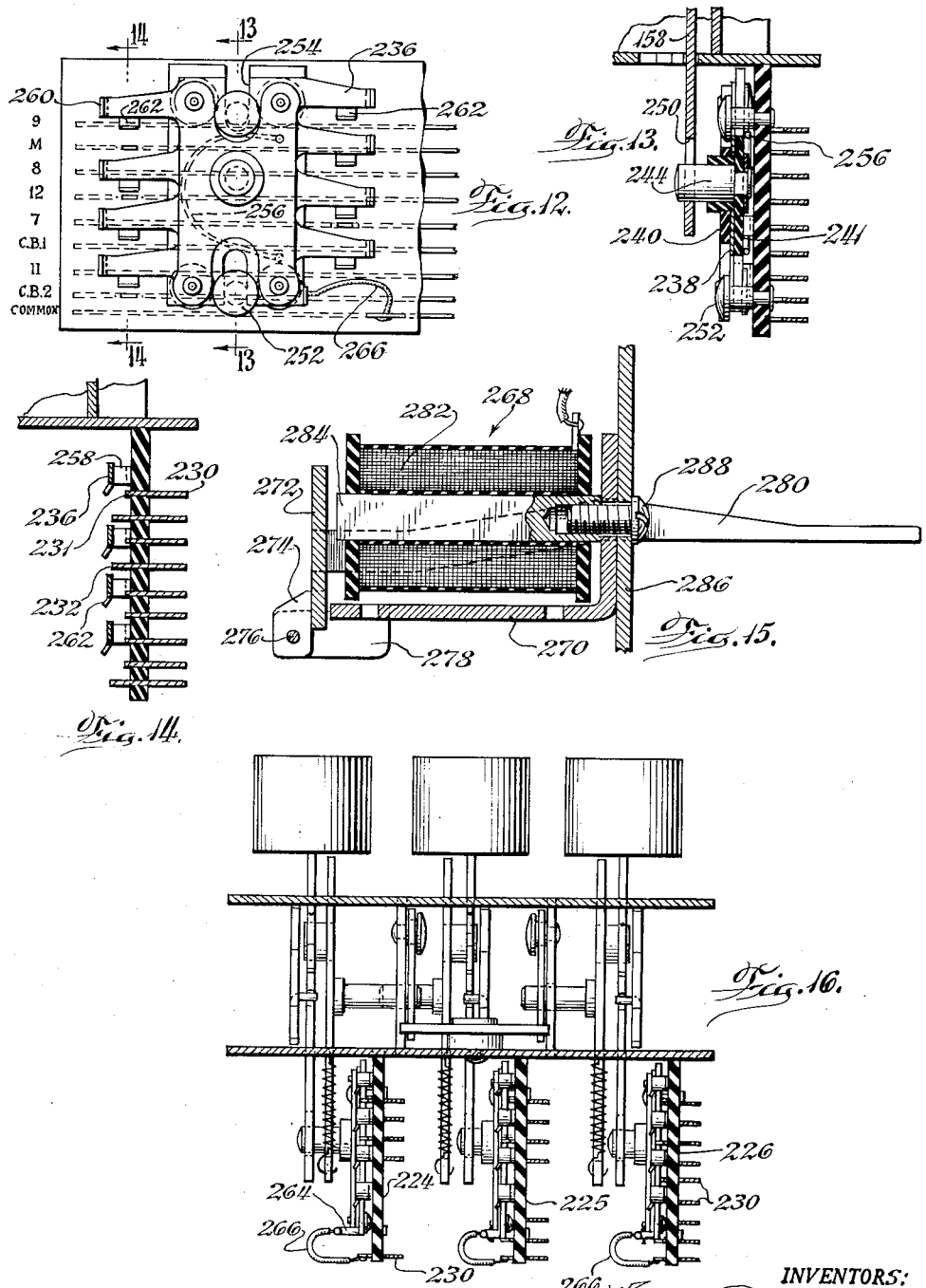

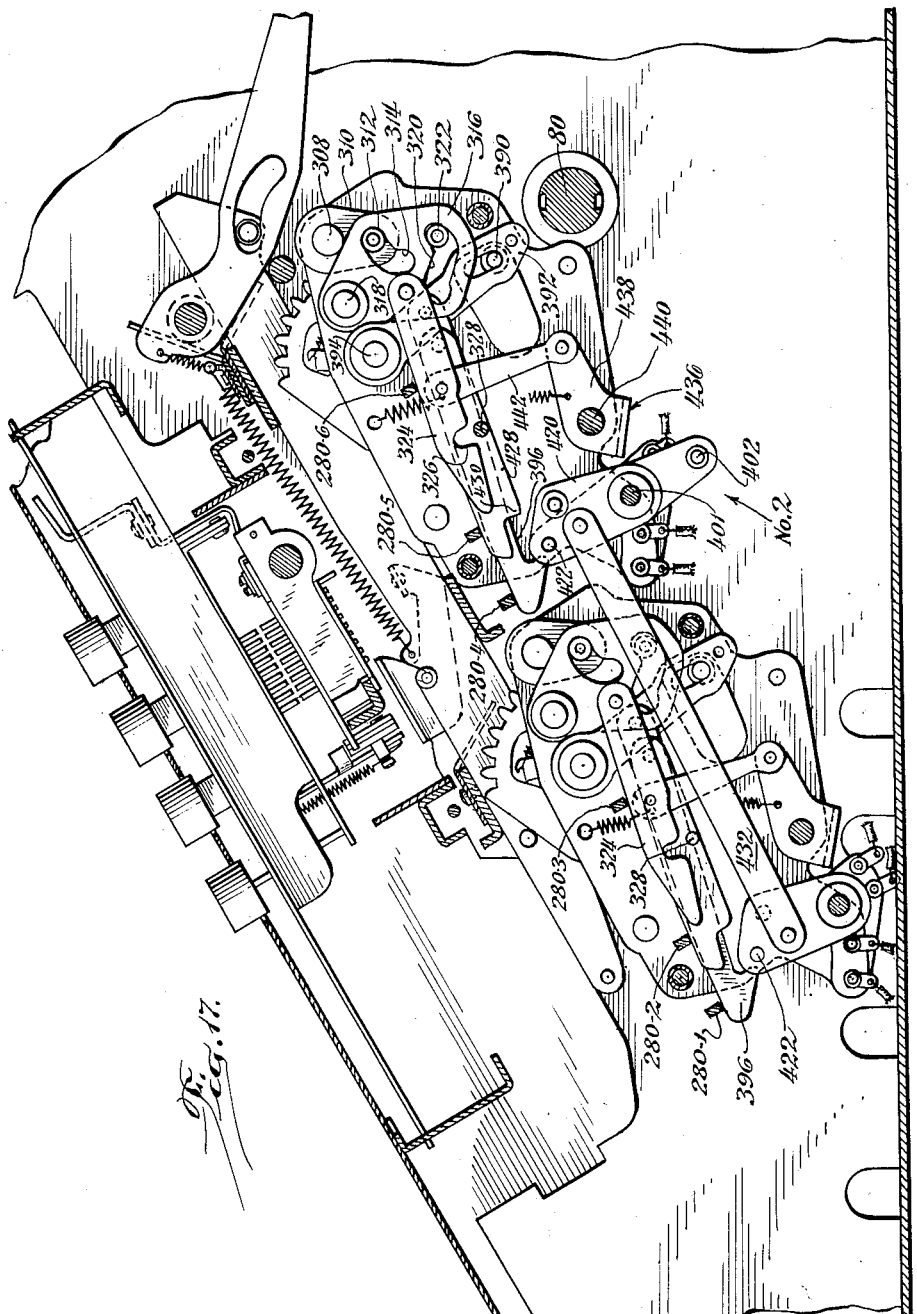

Dec. 19, 1961 T. O. MEHAN ET AL 3,013,717
ELECTROMECHANICAL CONTROLS FOR CALCULATING MACHINES
Filed Aug. 8, 1955 14 Sheets-Sheet 11

INVENTORS:
Thomas O. Mehan, Deceased,
By Laura M. Mehan, Executrix,
and, Robert C. Hoffman
By Ahlberg, Kupper & Gradolph
Attorneys

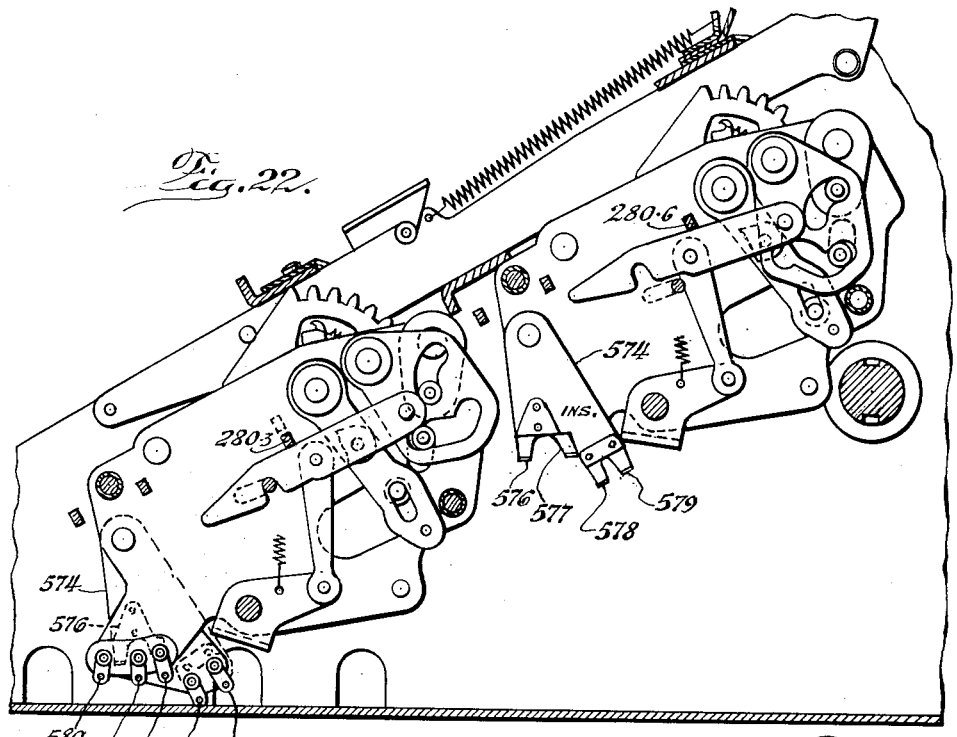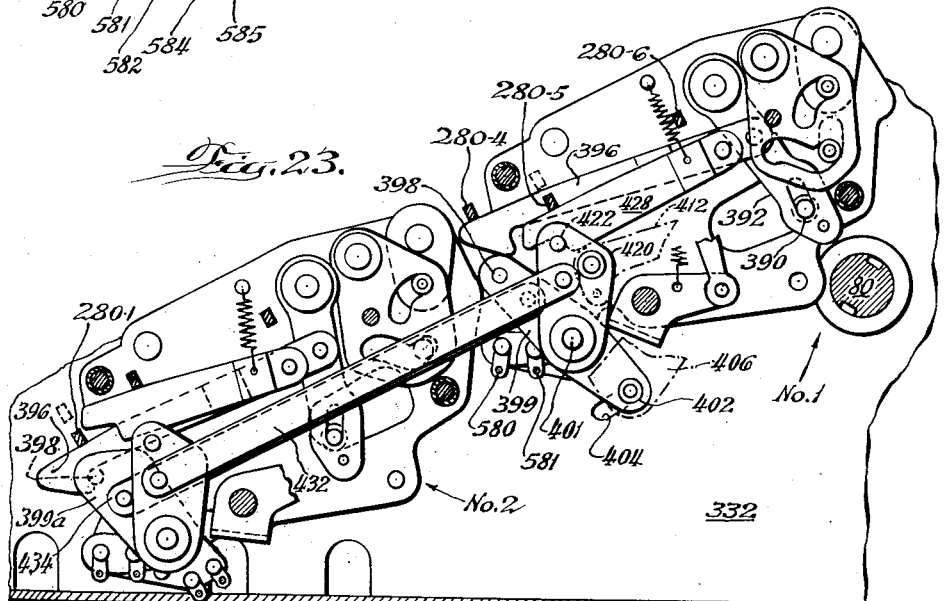

Dec. 19, 1961  T. O. MEHAN ET AL  3,013,717
ELECTROMECHANICAL CONTROLS FOR CALCULATING MACHINES
Filed Aug. 8, 1955  14 Sheets-Sheet 13
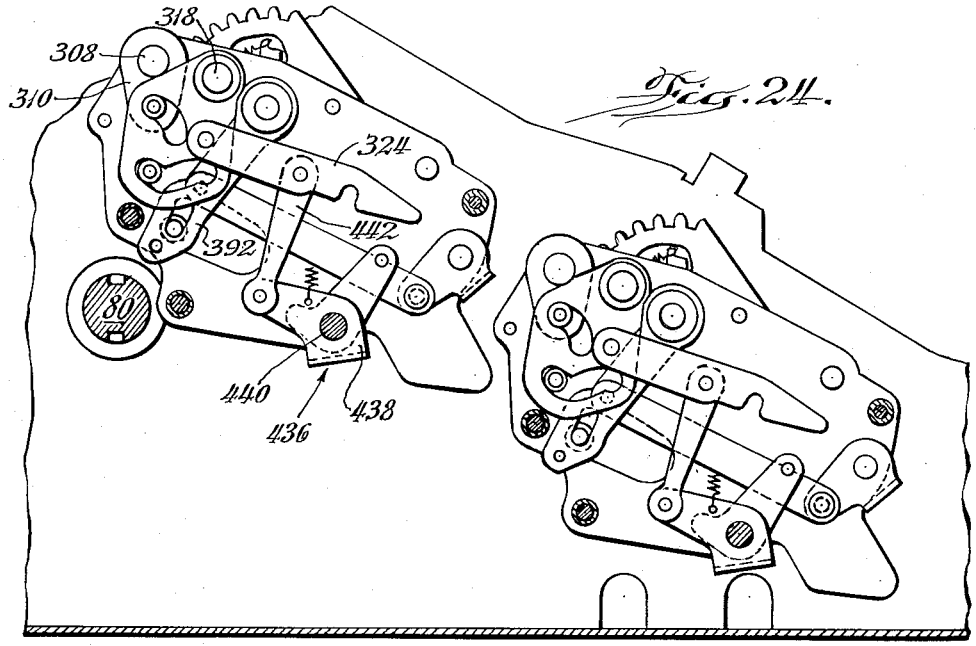
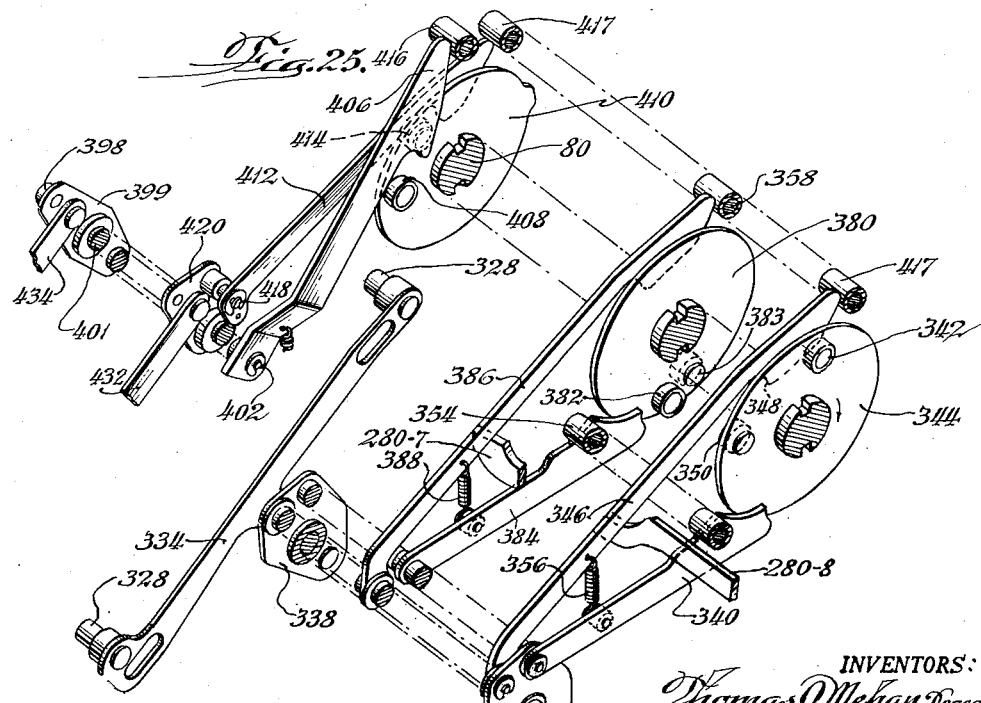

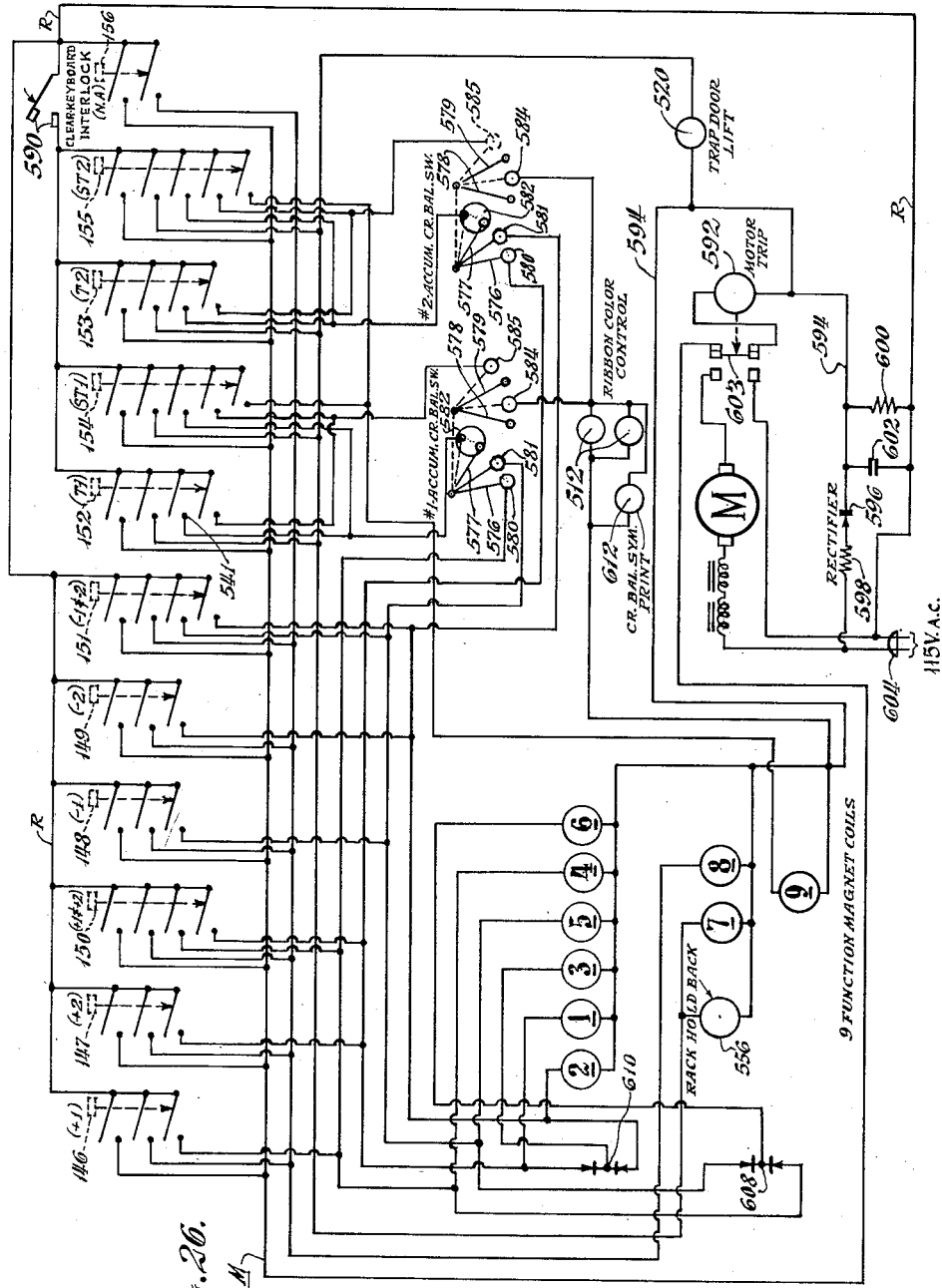

United States Patent Office 3,013,717
Patented Dec. 19, 1961

3,013,717
ELECTROMECHANICAL CONTROLS FOR
CALCULATING MACHINES
Thomas O. Mehan, deceased, late of Park Ridge, Ill.,
by Laura M. Mehan, executrix, Park Ridge, Ill., and
Robert C. Hoffman, Chicago, Ill., assignors to Victor
Adding Machine Co., Chicago, Ill., a corporation of
Illinois
Filed Aug. 8, 1955, Ser. No. 527,006
2 Claims. (Cl. 235—60)

Our invention relates generally to calculating machines, and more particularly to mechanical-electrical controls therefor to determine the character of the cycle to be performed, and to cause the making of a record of the type of cycle employed.

It is an obect of our invention to provide an improved calculating machine, preferably having a plurality of accumulators, and provided with control keys to determine the cycle of operation to be performed. For example, if the machine is provided with two accumulators, control keys are provided to predetermine whether an amount entered in the keyboard shall be added or subtracted in the first accumulator, added or subtracted in the second accumulator, whether a total or subtotal shall be taken from the first accumulator or from the second accumulator, or whether the amount shall be added or subtracted in both accumulators, or whether the amount shall be merely printed and not added or subtracted into either of the accumulators.

A further object is to provide an improved mechanical electrical control mechanism for determining the character of operation of the machine, which is readily adapted for control responsive to the position of the carriage in bookkeeping and like machines having a traveling carriage for the platen.

A further object is to provide a mechanical-electrical cycle control apparatus for calculating machines, which is equally adapted for use as part of a ten-key calculating machine or a full keyboard calculating machine.

A further object is to provide a mechanical-electrical cycle control apparatus for calculating machines, which is not necesarily located adjacent the machine itself, but may be remotely located.

Other objects will become apparent from the following description, reference being had to the accompanying drawings in which—

FIG. 8 is a fragmentary vertical sectional view, taken on the line 8—8 of FIG. 6;

FIG. 9 is a similar view, taken on the line 9—9 of FIG. 6;

FIG. 10 is a vertical sectional view, taken on the line 10—10 of FIG. 7;

FIG. 10a is a similar vertical sectional view, taken on the line 10a—10a of FIG. 7;

FIG. 11 is a similar view, taken on the line 11—11 of FIG. 7;

FIG. 11a is an end elevational view of the switching means, looking in the direction of the line 11a—11a of FIG. 7;

FIG. 12 is an enlarged elevational view of one of the multiple switches employed;

FIG. 13 is a sectional view of the switch, taken on on the line 13—13 of FIG. 12;

FIG. 14 is a fragmentary sectional view of the switch, taken on the line 14—14 of FIG. 12;

FIG. 15 is an enlarged sectional view of one of the electromagnets used to operate the controls, the section being taken on the line 15—15 of FIG. 2;

FIG. 16 is a generally vertical sectional view, taken on the line 16—16 of FIG. 5;

FIG. 17 is a vertical sectional view, taken on the line 17—17 of FIG. 3;

FIG. 22 is a vertical sectional view, taken on the line 22—22 of FIG. 3, showing the parts in the position when the rear accumulator (hereinafter termed accumulator No. 1) is not in mesh and the front accumulator (hereinafter termed accumulator No. 2) is in mesh, both accumulators being in subtract position;

FIG. 23 is a vertical sectional view, taken on the line 23—23 of FIG. 3, showing the No. 1 accumulator in subtract position and the No. 2 accumulator in add position, both accumulators being out of mesh with their operating gear segments;

FIG. 24 is a fragmentary vertical sectional view, taken on the line 24—24 of FIG. 3;

FIG. 25 is an exploded perspective view of the cams secured to the main shaft for operating several of the controls; and FIG. 26 is a schematic wiring diagram of the electrical control and motor energizing circuits.

GENERAL DESCRIPTION

Figure 1:
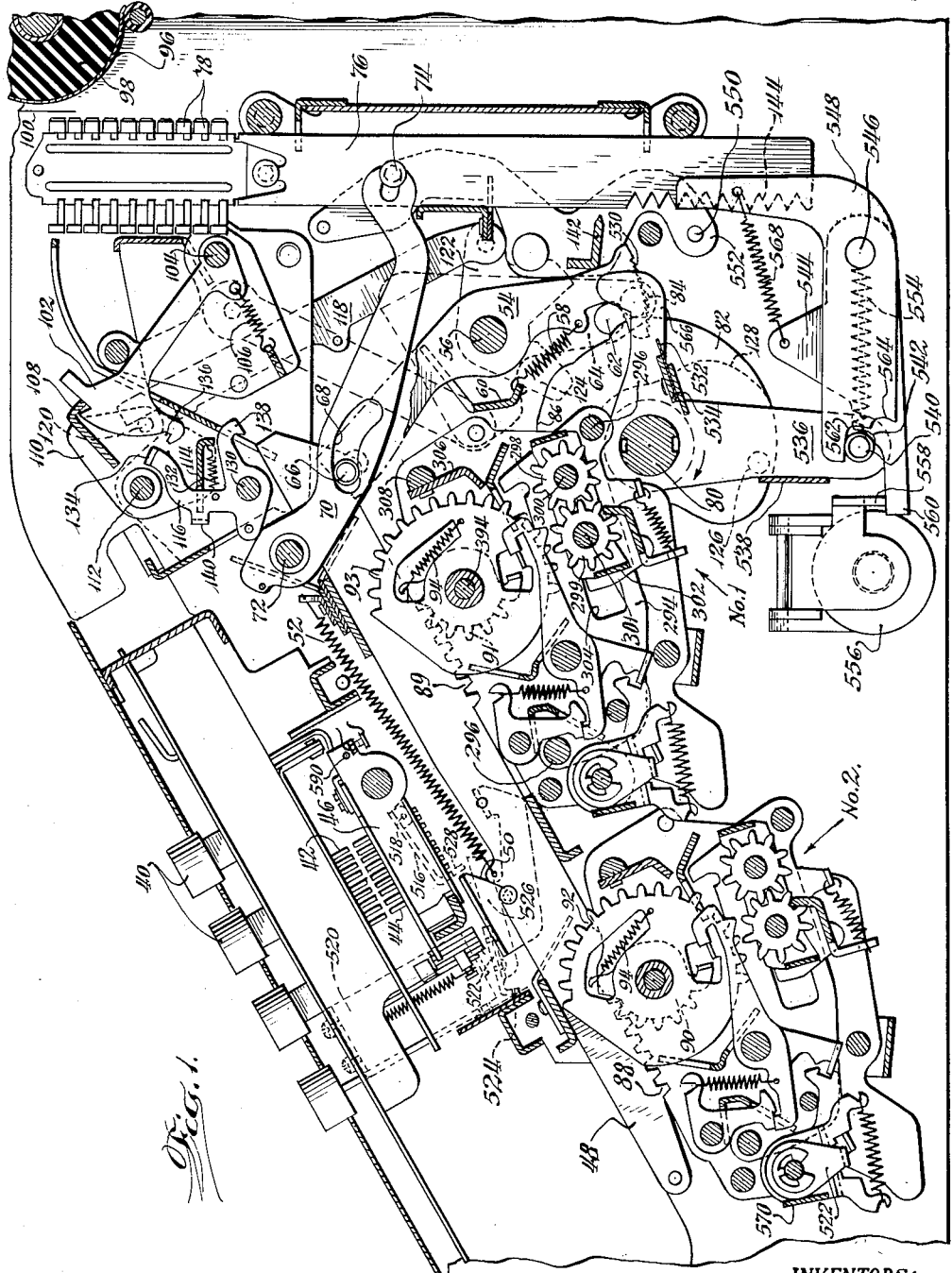
FIG. 1 is a fragmentary vertical cross sectional view of a calculating machine incorporating the invention, taken on the line 1—1 of FIG. 3.

The invention is herein illustrated as being embodied in a machine of the ten-key type, of well known construction, substantially as shown in the prior patent of Thomas O. Mehan, No. 2,550,581. The description of the machine, in so far as the construction is shown in said patent, will be rather general.

The amounts are set up by means of numeral keys 40, ten in number, the stems 42 of which are engageable with rows of stop pins 44 carried in a transversely reciprocable stop pin carriage 46. A downwardly projecting stop pin 44 will serve to arrest rearward movement of one of a plurality of actuators 48 by virtue of the engagement therewith of lugs 50 secured to the actuators 48 respectively. Each of the actuators is biased for rearward movement by a tensioned coil spring 52, such rearward movement of the actuators being normally prevented by virtue of the fact that each of the actuators is connected to a lever 54, these levers being pivoted on a shaft 56. These levers are biased to move clockwise not only by the springs 52 but by individual springs 58 suitably connected between the lower arms of levers 54 and a comb-like cross piece 60 which also serves as a separator and guide for the levers 54. The lower end of each of the levers 54 is engageable by a restoring bail rod 62 carried by a lever 64 pivoted on the shaft 56. The upwardly extending arm of each of the levers 54 is notched to engage a stud 66 having a roller thereon which is secured to the actuator 48. The roller on the stud 66 rides in an arcuate slot 68 formed in an arm 70 pivoted on a rod 72. The rearward end of each of the arms 70 is notched to engage a stud 74 secured to one of the type carrier bars 76 on which the type 78 are slidably mounted in the usual manner.

The general operator consists of main shaft 80, which is driven clockwise once during each cycle of operation of the machine by the usual motor and one revolution clutch mechanism, and has a pair of similarly shaped cams 82 secured near the ends of the shaft 80 for operation of the restoring bail 62, 64. For this purpose the bail arms 64 are provided with rollers 84 engaging the peripheral edges of plate cams 82, which, it will be observed, will permit the bail arms 64 to swing a short distance clockwise, which permits the actuators 48 to move rearwardly a short distance in order to reset the carry or transfer mechanism so that during a total or subtotal taking cycle the resetting of the carry or transfer mechanism will have been completed before the actuators are moved rearwardly to set the printing mechanism for the printing of the total or subtotal. This mechanism, and the manner in which it operates, is essentially the same as that shown in the prior patent to Thomas O. Mehan and Hunter E. Hooe, No. 2,429,522.

After the main shaft has moved through approximately eighty degrees, the rollers 84 will have reached the high points 86 of the cams 82 and the bail arms 64 will thereafter be free to swing clockwise and permit the springs 52 to move the actuators 48 rearwardly to the extent permitted by the stop pins 44.

Each of the actuators 48 has a pair of racks 88, 89 in its lower edge for the actuation of accumulators Nos. 2 and 1, respectively. The racks 88 and 89 are respectively in mesh with segmental gears 90 and 91, and these gears are respectively connected to gear segments 92 and 93 by tension springs 94 for making it possible to effect a transfer. This mechanism is more fully disclosed in the prior patents to Mehan Nos. 2,411,050 and 2,550,581. The construction and operation of the two accumulators Nos. 1 and 2 are essentially the same.

As the actuators 48 move rearwardly until stopped by the stop pins 44, their associated type carriers move upwardly to position the type 78 representing the amount entered in the stop carriage in position for making the impresison upon a record tape 96 on a platen 98 by virtue of the type pressing a ribbon 100 against the tape. The means for moving the type towards the record tape comprises hammers 102 pivoted on a shaft 104 and biased to swing clockwise by springs 106. They are normally restrained from such movement by a latch-like element 108 carried by a pair of arms 110 pivoted on the shaft 112. A cross bar comb element 114 is also secured to the arms 110 and provides a guide for latches 116 which are individual to each of the actuators 48. The latch 108 and its connected arms, as well as the comb member 114, are swung counterclockwise by links 118, the upper ends of which engage studs 120 carried in the arms 110. The lower ends of the links 118, one at each side of the machine, are pivotally connected to levers 122 pivoted on shaft 56, the inwardly and downwardly extending arms 124 of these levers being engageable by studs 126 projecting sidewardly from cams 128. Thus the studs 126 will engage the arms 124 and swing the levers 122 counter-clockwise to raise the latch 108.

Each of the latches 116 is mounted on a fixed rod 130, the latches being biased for clockwise movement by springs 132. Thus, as the latch 108 is raised, additional tension is applied to the latches 116, tending to move them clockwise and to cause engagement of a sidewardly extending ear 134 on the latches to engage in notches 136 formed at the forward tail portion of the hammers 102. The latches 116 have rearwardly extending arms 138 which are adapted to engage the top edges of the actuators 48 so that in such denominational orders as an amount has been entered the actuator 48 therefor is moved rearwardly and the latches 116 will be prevented from moving clockwise so that they will remain free from the notches 136. However, if an amount has been entered in the denominational order, or in any higher denominational order, the latch associated therewith will be restrained from swinging clockwise under the influence of its spring 132, so that the associated hammer 102 will be free to make the printing impression upon its release from the latch 108. Each of the latches 116 has a sidewardly extending ear 140 which overlies the corresponding ear of the latch for the next higher denominational order to cause the printing of zeros to the right of the highest denominational order in which an actuator 48 has moved rearwardly.

Just before the hammers are released, a rectifier or aligning bar 142 is brought into engagement with one of a series of notches 144 formed in the forward edges of the type carriers 76 associated with actuators which have been moved rearwardly so as to align the type prior to the release of the hammers. The mechanism for accomplishing this is of a conventional character.

ELECTROMECHANICAL CONTROLS AND OPERATORS

As previously indicated, the machine is adapted to be set to operate through any of eleven different types of cycles. In the conventional calculating machine, the machine is conditioned to perform various kinds of cycles by key set mechanical linkages. In the present machine the function control keys operate switches which complete circuits to selected electromagnets and the latter set parts which determine the character of the machine cycle to be performed, and the function control keys themselves cause energization of the electric driving motor.

Figure 5:
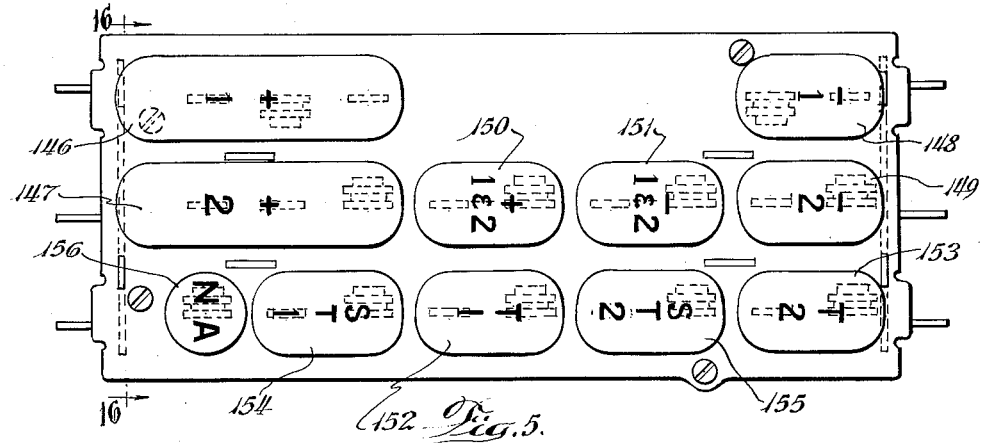
FIG. 5 is a plan view of the control keyboard, taken on the line 5—5 of FIG. 2.

The function control keys are best shown in FIG. 5, and comprise: a key 146 which, when operated, will cause the amount entered in the stop carriage to be added in the No. 1 accumulator; a key 147 which will cause addition in the No. 2 accumulator; a key 148 which will cause subtraction in the No. 1 accumulator; a key 149 to cause subtraction in the No. 2 accumulator; key 150 to cause addition in both accumulators; key 151 to cause subtraction in both accumulators; key 152 to cause a total to be taken from the No. 1 accumulator; a key 153 to take a total from the No. 2 accumulator; a key 154 to cause a subtotal to be taken from the No. 1 accumulator; a key 155 to cause a subtotal to be taken from the No. 2 accumulator; and a key 156 to cause a nonadd cycle of the machine.

Figure 6:
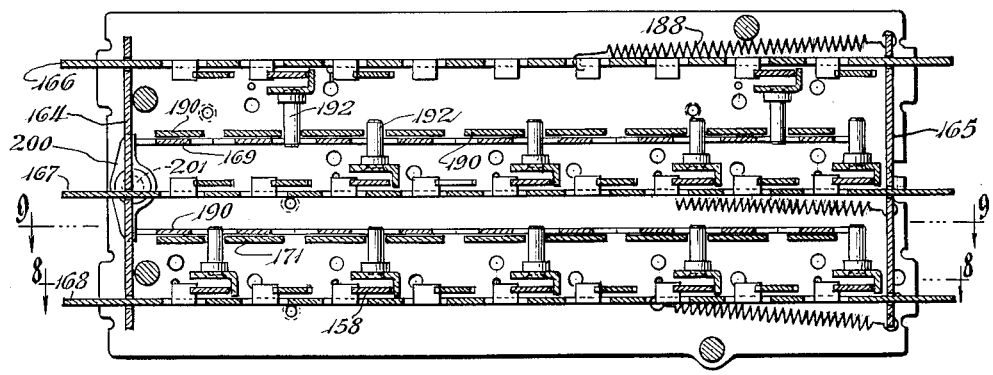
FIG. 6 is a generally horizontal sectional view, taken on the line 6—6 of FIG. 2.

As shown in FIG. 8, the key 156 has a stem 158 guided in a slot formed in a top keyboard plate 160 and by a slot in a lower keyboard plate 162. These plates are suitably secured together by transverse plates 164 and 165, as well as longitudinal vertical plates 166, 167, 168 (FIG. 6), as well as intermediate vertical longitudinal plates 169 and 171. An auxiliary key stem 170 (FIG. 9) is likewise reciprocable in slots formed in plates 160 and 162, this auxiliary key stem 170 having a sidewardly extending lug 174 (FIGS. 8 and 9) which projects into a notch 176 formed in the key stem 158 normally abutting against the upper edge of the notch engaging a shoulder 178. Each of the other keys 146 to 155, in addition to having a stem 158, has an auxiliary guiding stem 180 and each of the other keys also has an auxiliary stem 170. The key stems 158 are provided with saw toothed cams 182 which engage lugs 184 on a key locking slide 186, which is guided for reciprocation in the end plates 164 and 165, and are pulled forwardly by tension spring 188 (FIG. 6) so as to lock an operated key in depressed position.

To prevent depression of more than one key at a time, the keyboard is provided with two rows of pendant gate locks 190 (FIGS. 6 and 9) pivoted to vertical plates 169 and 171. Each of the auxiliary key stems 170 is provided with a stud 192 projecting sidewardly through an open end slot 194 formed in the longitudinal vertical plates 169 or 171, these studs being adapted to engage the camming surfaces of the pendant gate locks and spread them apart provided no other key is depressed. The key stems 158 are biased to their upper normal positions by return springs 196, while the auxiliary stems 170 are similarly biased to upward position by tension springs 198. The upward movement of the key stems 158 is limited by the engagement of a shoulder 199 with the lower keyboard plate 162. The auxiliary key stems have their upper motion limited by the engagement of the sidewardly extending lugs 174 with the shoulders 178 on the key stems 158.

It will be noted that there are but two rows of gate locks 190, the row pivoted to the plate 169 serving for the two left-hand rows of keys 146 to 151.

The two rows of gate locks 190 are interlocked so as in effect to operate as a single row by a lever 200 (FIG. 6) pivoted on a stud 201 secured to the bottom frame plate 162. It will be understood that when one of the studs 192 is inserted between the lower portions of two adjacent gate locks 190, it will prevent the depression of any other key of the three rows of keys.

Shortly before the completion of an operating cycle of the machine, the high part of a cam 202 (FIG. 2) secured to the main shaft 80 engages a roller 204 on a lever 206 pivoted on a stud 208. The other arm of the lever 206 is pivotally connected to a slide 210 which has a notch 212 in engagement with a stud 214 at the end of a bell-crank 216 secured to a short shaft 218. An arm 220, together with the upwardly extending arm of the bell-crank 216 and a cross member 222, form a bail which when swung forwardly engages the rear ends of the latching slides 186, thereby freeing the key stems 158 as well as the auxiliary key stems 170 for return to normal position.

KEY OPERATED SWITCHES

Figure 7:
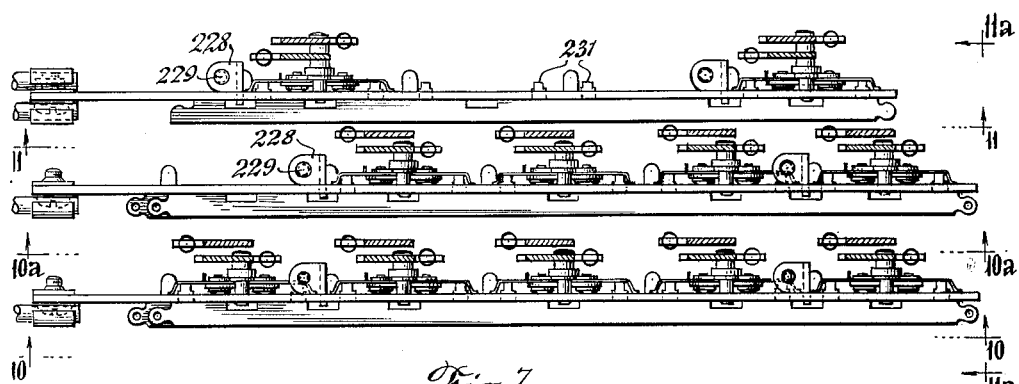
FIG. 7 is a similar sectional view, taken on the line 7—7 of FIG. 2.

As will be described in detail hereinafter, each of the control keys 146 to 156 is arranged to operate a plurality of switches. The stationary portions of these switches are secured to vertical plates 224, 225, and 226 (FIGS. 10, 10a, and 11) of insulating material, which are suitably secured to the lower keyboard plate by brackets 228 (FIG. 7) which are staked to the insulating plates and secured to the lower horizontal keyboard plate by screws 229.

The stationary contacts of the switches are provided by bus bars 230 which are staked to the insulating plates 224—226 by short projections 231, and as best shown in FIGS. 14 and 16, have longer lugs 232 projecting beyond the left-hand faces of the insulating plates 224—226 to provide the stationary contacts for the switches.

The movable contacts of the switches are provided by a plurality of switch fingers 236 extending forwardly and rearwardly from a central body portion 238 (FIG. 10a), the latter being clamped between a pair of insulating sheets 240 and 241 (FIG. 13), being riveted to form a rigid assembly by a shouldered stud 244 which, as shown in FIGS. 8, 9, and 13, projects into a notch 250 formed in its associated key stem 158. It will be noted that there is substantial clearance between the upper edge of the notch 250 and the stud 244 so that there is some lost motion which is provided for a purpose which will appear hereinafter.

The movable contact assembly is guided for vertical movement by a pair of studs 252 riveted to the insulating plates 224—226. The headed studs 252 extend through open end slots 254 formed in the movable contact assemblies, and the latter are urged to move upwardly by U-shaped wire springs 256 (FIGS. 12 and 13), the ends of which are respectively anchored in one of the insulating plates 224—226 and the insulating plates 241 of the movable contact assemblies.

Each of the switch fingers 236 has a sidewardly extending portion 258 (FIG. 14) which terminates in a foot portion 260 (FIG. 12) that slides against the surface of the associated insulating plate 224—226, the switch fingers being resilient and biased to maintain such contact. As best shown in FIG. 14, each of the switch fingers 236 has an inclined projection 262 for making contact with a fixed contact lug 232. Thus, as the movable contact assembly is moved downwardly, the switch fingers are flexed and the inclined projection 262 of a switch finger 236 engages one of the fixed contact lugs 232. The switch finger is cammed outwardly so that a good wiping contact is assured and maintained. It will be noted, particularly in FIGS. 10, 10a, 11, 12, and 14, that the uppermost switch finger 236 is normally spaced from its fixed contact lug 232 a greater distance than the other switch fingers are spaced from their fixed contact lugs. Thus, the circuit controlled by the uppermost switch finger 236, which is effective to control the energization of the drive motor, will make contact only after the other switch fingers have made contact.

Figure 2:
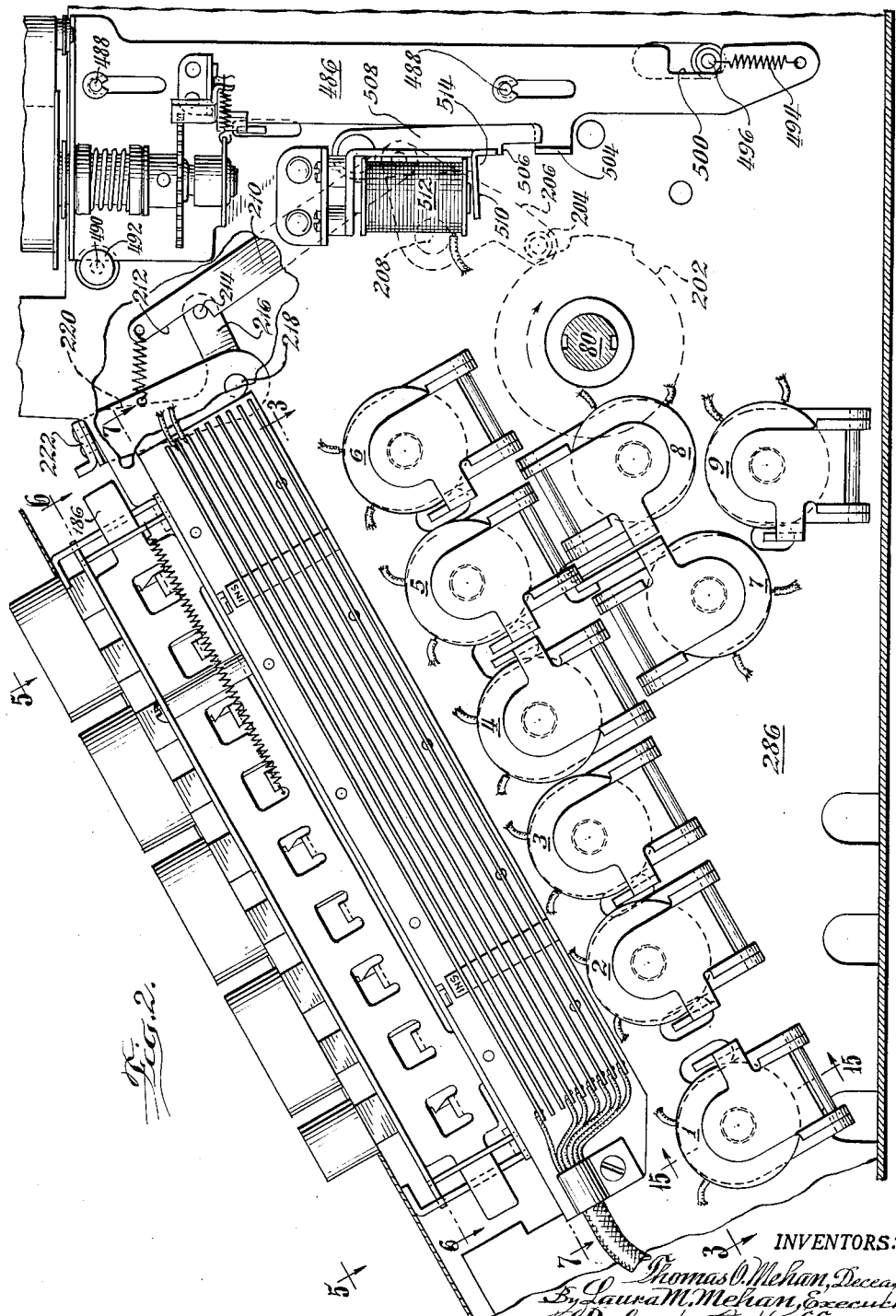
FIG. 2 is a sectional view, taken on the line 2—2 of FIG. 3.
Figure 3:
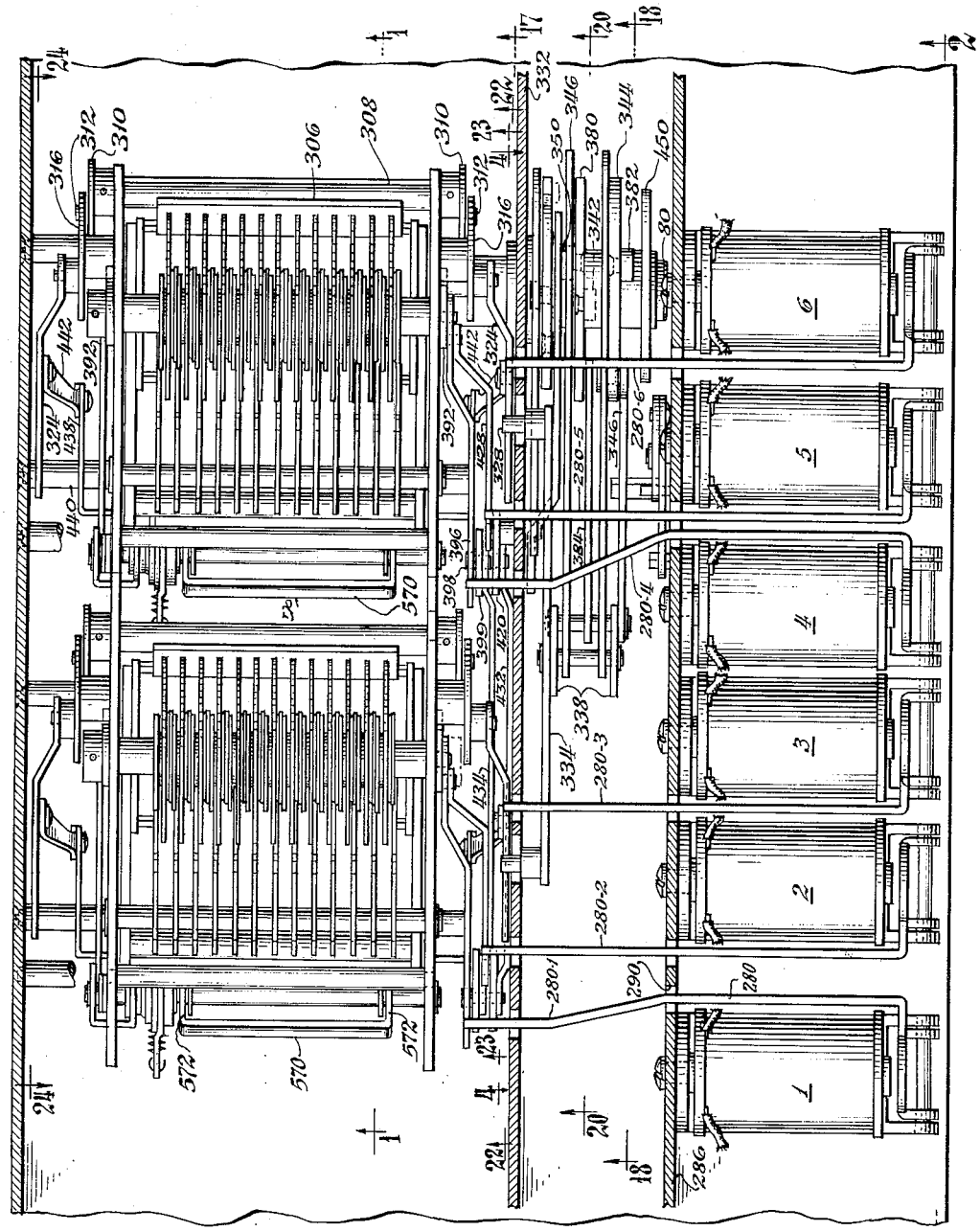
FIG. 3 is a fragmentary substantially horizontal sectional view, taken on the line 3—3 of FIG. 2.

Each of the body portions 238 of the movable contact assembly has a sidewardly extending lug 264 which is connected by a flexible braided wire 266 (FIGS. 12 and 16) to the lowermost bus bar 230 secured to each of the three plates 224—226. As will appear thereinafter, the switches above described control circuits which operate electromagnets 268 (FIG. 15) each comprising a magnetically permeable L-shaped bracket 270, an armature 272 which has a pair of ears 274 pivoted on a pin 276 carried by downwardly extending ears 278 formed on the bracket 270. Each of the armatures has an actuating arm 280 formed integrally therewith and extending in a direction parallel to the axis of the electromagnet. The coil 282 of the electromagnet is wound around a suitable form which surrounds a soft iron core 284, the latter, together with the bracket 270, being secured to a supporting plate 286 by a screw 288 (FIGS. 2, 3, and 15). As shown in FIGS. 2 and 3, some of the arms 280 have offsets formed therein and these arms extend through suitable elongated slots 290 formed in the electromagnet supporting plate 286 and similar slots in a plate 332.

In FIGS. 10, 10a, and 11, the bus bars 230 are broken away so as more clearly to illustrate the arrangement of the fixed contact lugs 232 with respect to the movable switch contactors provided by the fingers 236.

The various bus bars 230 are individually identified by reference characters 1, 2, 4, 5, 7, 8, 9, 11, 12, M (motor), $CB_1$ (credit balance No. 1 accumulator), $CB_2$ (credit balance No. 2 accumulator), and R (the common return conductor). These identifying characters are correlated with corresponding reference characters on the wiring diagram (FIG. 26) and except for the return conductor R, are parts of the circuit for energizing electromagnets 1 to 9, and motor M, respectively (FIG. 26).

Several of the bus bars 230 secured to the insulating plates 224—226, are interconnected by jumper conductors 292 (FIG. 11a). The various arms 280 forming parts of the electromagnet armatures will hereinafter be individually designated by reference character 280 with a dash, followed by the number of the electromagnet to which such arm is attached.

FIG. 17 shows the mechanism controlled by the electromagnets. This mechanism is shown in generally horizontal section in FIG. 3.

Referring to FIG. 1, the No. 1 accumulator is carried by a cradle comprising a pair of side plates 294 and suitable transverse connecting rods 296 which are pivoted so that by being swung counterclockwise either the add pinions 298 or the subtract pinions 299 meshing therewith are brought into engagement with the segmental gears 93 by swinging the cradle upwardly. The pinions 298 are rotatable on a shaft 300, while the pinions 299 are rotatable upon a shaft 301, these shafts being mounted in a frame 302 which is mounted for sliding movement in elongated slots 304 formed in the cradle side plates 294 as disclosed in more detail in the aforesaid Patent 2,550,581.

Figure 20:
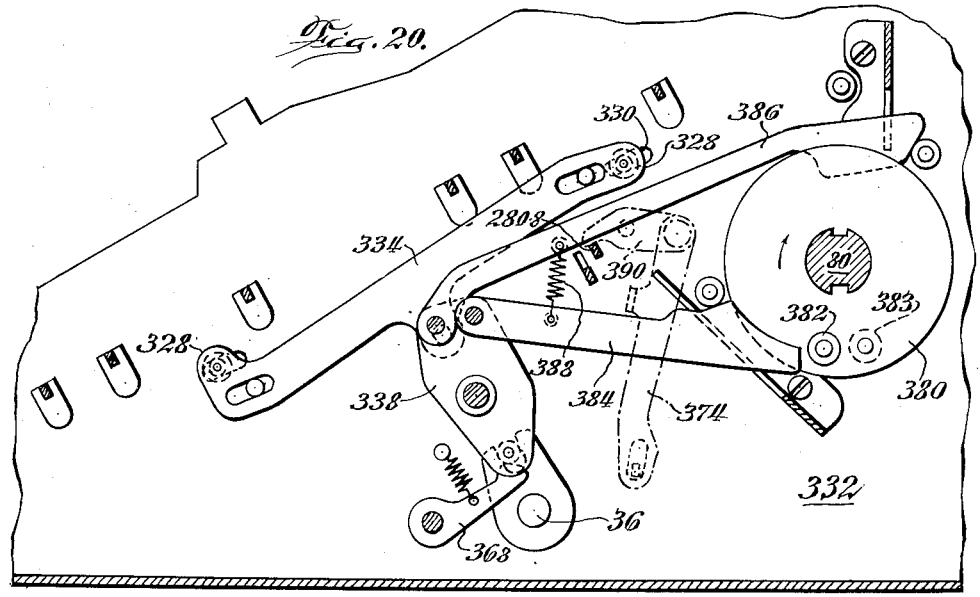
FIG. 20 is a vertical sectional view, taken on the line 20—20 of FIG. 3.

An aligner or rectifier bar 306 is secured to a shaft 308 suitably mounted for rotation in the frame plates of the machine. As shown in FIGS. 3 and 17, this shaft 308 has a pair of arms 310 secured thereto, these arms carrying rollers 312 which ride in arcuate slots 314 formed in cam arms 316 which are pivoted on studs 318. Thus, as the cam arm 316 is swung counterclockwise (by means hereinafter to be described) the shaft 308 is swung first clockwise and then counterclockwise to cause the aligner bar 306 (FIG. 1) to engage between the teeth of the gear segment 93 to bring the gear segments into alignment. The cam arm 316 has a second generally Z-shaped slot 320 which cooperates with a roller 322 mounted on the cradle plate 294, and is operative to raise the cradle to bring the accumulator pinions 298 or 299 into mesh with the gear segments 93. The cam arm 316 is swung rearwardly by virtue of its connection by a link 324 which when operating has a notch 326 in engagement with a stud 328 which, as shown in FIGS. 17 and 20, extends inwardly through a slot 330 in an intermediate frame plate 332, and is carried by a slide 334 guided for to and fro movement by studs 336 projecting through suitable elongated slots in the slide 334. The slide 334 has a pin and slot driving connection with the upwardly extending arm of a rigidly interconnected double lever 338 (FIG. 20). The upwardly extending arm of one lever 338 also has a pivotal connection with a link 340 (FIG. 25) the rearward end portion of which is adapted to be engaged by a roller 342 on a disc 344 secured to the main shaft 80.

A hook link 346 is (through arms 338) pivotally connected to the slide 334 and has a hook portion 348 adapted to be engaged by a stud 350 on the disc 344. These parts are shown in normal position in FIG. 25, so that shortly after the commencement of an operating cycle the hook link 346 will be pulled rearwardly and, through the slide 334 and its connection with the link 324, by means of the stud 328 and notch 326 swing the cam arm 316 counterclockwise.

Figure 19:
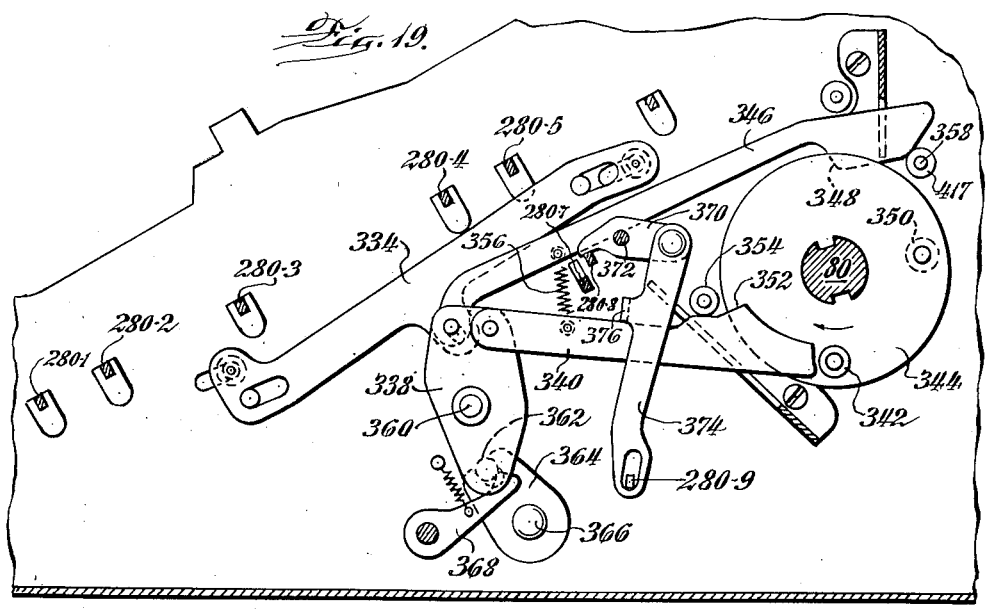
FIG. 19 is a view similar to FIG. 20, showing the parts in displaced position.

Toward the end of the cycle the parts will be in the position shown in FIG. 19, and thereafter the roller stud 342 will engage the end of link 340 and through the lever 338 and slides 334, etc., swing the cam arm 316 clockwise to the position in which it is shown in FIG. 17. As the stud 342 pushes the link 340 forwardly (FIG. 19), a cam surface 352 on the link 340 engages a roller 354 which is effective to swing the link 340 downwardly so as to remove its end from the path of the stud 342. The roller 354 also acts as an upper limit stop to position the link 340 properly, such positioning being effected by a spring 356 which is stretched between the link 340 and the hook link 346, holding the latter against one of a plurality of rollers 417 mounted on stud 358. One of these rollers, due to its location, is effective to cam the hook link 346 upwardly so as to free it from engagement with the roller 350.

The levers 338 are pivoted on a stud 360 and their downwardly extending arms are provided with a stud 362 which engages in an open end slot formed in the end of an arm 364 secured to a shaft 366 which extends transversely of the machine. A spring biased detent 368 is provided to hold the above described linkage in either of its two positions.

At the left-hand side of the machine the arm 364 (FIGS. 3 and 24), lever 338, slide 334, stud 328, link 324, cam arm 316, and arm 310 are duplicated. A lever 370 (FIG. 19) is pivoted on a stud 372 and has the upper end of a link 374 pivoted to its rearwardly extending arm. This link has a sidewardly bent lug 376 which overlies the link 340 so that when the link 374 is moved downwardly, the rearward end of link 340 is moved out of the path of the roller 342, and thus the accumulators will remain in mesh for subtotal cycles. The downward movement of the link 374 is accomplished by energization of the 9 electromagnets which has its arm 380-0 projecting through an elongated slot at the lower end of link 374. The arm 280-8 of the electromagnet 8, when the latter is energized, swings the lever 370 clockwise and moves the end of the link 340 out of the path of stud 342 and in addition engages the hook link 346 and raises the latter so that its hook portion 348 will be removed from the path of the roller 350. Thus, for nonadd operations the accumulator will not be meshed with the gear segments on either the forward or return stroke.

Figure 18:
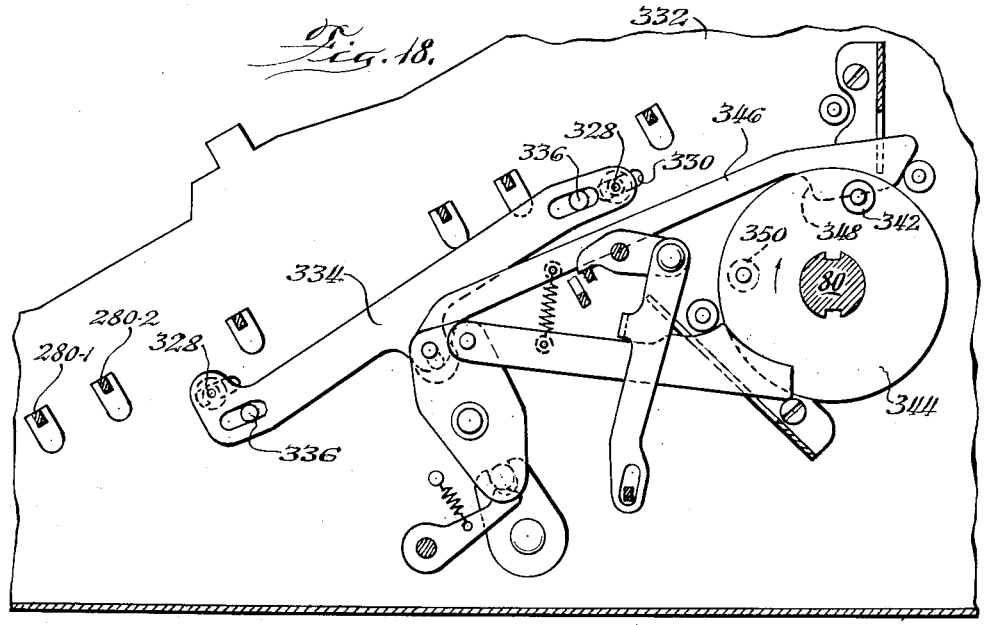
FIG. 18 is a fragmentary vertical sectional view, taken on the line 18—18 of FIG. 3.

It will be understood that the parts last described are shown in normal position in FIG. 18 and in FIG. 19 in the position assumed after completion of the forward stroke and just prior to the commencement of the return strokes of the actuators.

Figure 21:
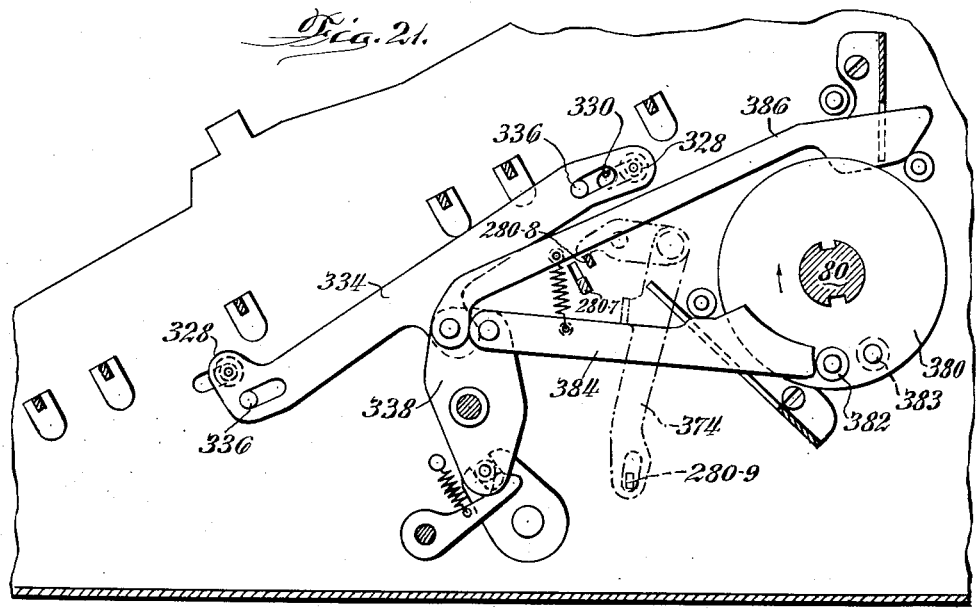
FIG. 21 is a view similar to FIG. 20, showing the parts in displaced position.

FIGS. 20 and 21 show the mechanism for moving the accumulators between add and subtract positions. This mechanism comprises a disc 380 secured to the main shaft 80 and having a pair of rollers 382, 383 on the opposite sides thereof. The roller 382 is adapted to abut a link 384 while the roller 383 cooperates with a hook link 386. The hook link 386 is pivotally connected to the slide 334 (through the arms 338) and the link 384 is pivoted to the levers 338 in the same manner as previously described with reference to FIGS. 18 and 19. The links 384 and 386 are urged to swing toward one another by a tension spring 388.

In FIG. 20 the parts are shown in normal position, whereas in FIG. 21 the parts are shown in the position assumed when either the accumulator pinions 298 or 299 are in mesh.

Referring to FIGS. 1 and 17, the frame 302 in which the accumulator shafts 300 and 301 are mounted, it will be recalled, is slidable in a slot 304 formed in the tilting cradle for the accumulator. This frame 302 has a pair of sidewardly projecting studs 390 (one on each side—FIG. 17) and these studs project through slots in arms 392 which are nonrotatably secured to shaft 394. This shaft also serves as a pivot shaft for the actuating segments 93. A hook link 36 is pivoted to arm 392 at its rearward end and its forward hooked end is adapted to engage a stud 398 (FIG. 3) carried at the upper end of a lever 399 pivoted on a stud 401 (FIG. 23).

The lower end of the lever 399 has a stud 402 which projects through a slot 404 formed in frame plate 332 and forms a pivot for a hook link 406 (FIG. 25), the hook portion of which is adapted to be engaged by a roller 408 carried on a cam 410 fixed to the main shaft 80. A similar hook link 412 has its rearward hook portion engageable by a roller 414, also mounted on the cam 41 on the opposite side thereof. Rollers 416 and 417 cooperate with the cam surface on the hook portions of the links 406 and 412, respectively, to cam these hook links out of engagement with their rollers 408 and 414, respectively, after the links have been pulled the requisite distance. The forward end of hook link 412 is pivoted to a stud 418 secured to a rocker plate 420 pivoted on stud 401 and has a sidewardly extending stud 422 (FIG. 23) secured thereto. The arm 396 is adapted to be swung downwardly against its spring bias by arm 280-4 when the magnet 4 is energized, and thus lie in front of stud 398. Therefore, when the hook link 406 (FIG. 25) is pulled upwardly and rearwardly, the counterclockwise pivotal movement of lever 399 will, through stud 398 (FIG. 23), link 396, arm 392, and stud 390, slide the accumulator frame forwardly to add position. The accumulator positioning parts are shown in the subtract position in FIG. 17.

After the accumulators have been shifted forwardly as above described, assuming that the machine has been conditioned for an adding, totaling, or subtotaling functional cycle, the electromagnet 5 will have been energized to move its arm 280-5 (FIGS. 17 and 23) downwardly, and the end portion of this arm engaging above an arm 428 will have lowered the latter so that its notched forward end portion 430 will lie behind stud 422. Thus, as the latter is swung rearwardly, by virtue of its operation through hook link 412 (FIG. 25), it will return the accumulators to the subtract position shown in FIG. 17.

The rock arm 420 (FIGS. 17 and 23) is connected by a link 432 with a similar rock arm for the No. 2 accumulator. Link 434 (FIG. 25) connects lever 399 to a similar lever 399a for the No. 2 accumulator.

It will be understood that there is an arm 324 (FIG. 24) at the left-hand side of the machine and to operate this arm, together with the arm 324 on the right-hand side of the machine, there is provided a bail-like member 436 having arms 438 pivoted on studs 440. The rearward ends of the arm 438 are connected by links 442 to their respective arms 324.

When electromagnet 9 is energized, its arm 280-9 not only pulls the link 374 downwardly (FIG. 19) to move the link 340 out of the path of the roller 342, but also (FIG. 4) swings an arm 444 counterclockwise, and through a link 446 positions a signal type for indication of a subtotal.

Again referring to FIG. 4, a roller 448, mounted on a plate cam 450 secured to the main shaft 80, is adapted to engage a lever 452 pivoted on a stud 454 and connected by a link 456 with a pawl having a tooth part 460 engageable with a ratchet wheel 462 operatively connected with a ribbon spool 464 for rotating the latter. The pawl 458 is pivotally connected to one arm 466 of a three-armed lever 468 pivoted on a shaft 470. When the tension on the ribbon 100 exceeds a predetermined maximum, the pawl 458 having its upper tooth portion 460 arrested, swings the three-armed lever 468 clockwise to the position shown in FIG. 4, and through link 474 swings a detent plate 476 counterclockwise against the force applied by spring 478, which operates through a detent arm 480 and a roller 482 to hold the detent plate 476 in either of its two operative positions. The detent plate 476, through link 484 which is secured to shaft 470, operates to shift the corresponding pawl 458 on the right-hand side of the machine into operative engagement with its corresponding ratchet wheel 462.

Figure 4:
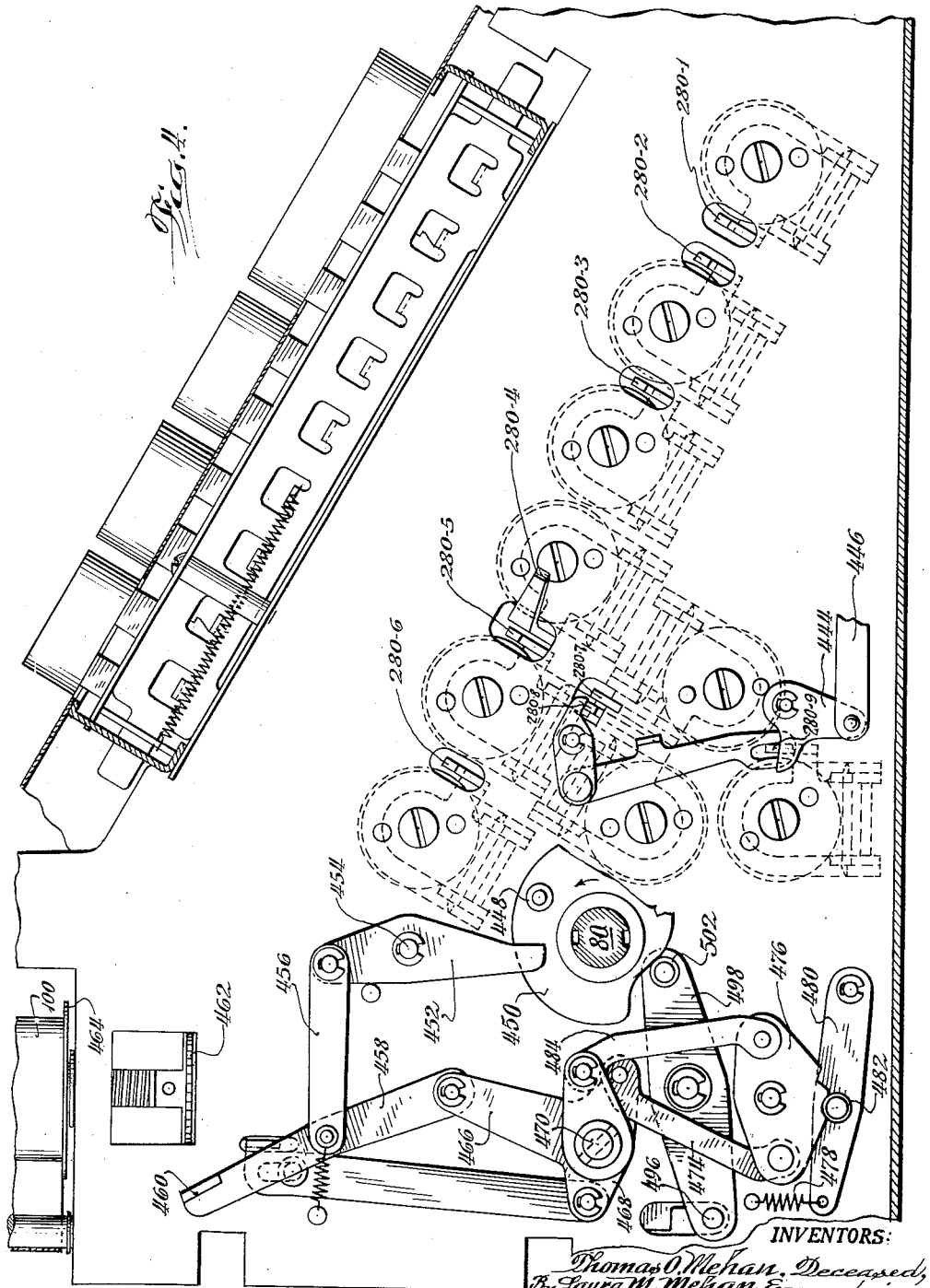
FIG. 4 is a vertical sectional view, looking from the left, taken on the line 4—4 of FIG. 3.

The ribbon 100 is preferably two color, having a blue or black upper band and a red or other contrasting lower band. The ribbon spools are mounted on a frame comprising a pair of vertically movable members 486 (FIG. 2) guided by studs 488 which project through suitable elongated slots in these members, and by studs 490 provided with guiding washers 492. The frame members 486 are biased to move upwardly by springs 494 which are secured to studs 496 carried on the ends of levers 498 (FIG. 4). The studs 496 project into open slots 500 in the members 486 to provide a lost motion driving connection between the levers 498 and the frame members 486. The lever 498 has a follower roller 502 which engages the cam 450 so that during each cycle of operation the levers 498 (FIG. 4) are pivoted clockwise to raise their studs 496 and thus urge the frame members 486 upwardly. Such upward movement is normally limited by engagement of lugs 504 on the members 486 with shoulders 506 on pivoted arms 508.

Through suitable motion multiplying linkage the armature 510 of a pair of electromagnets 512 is adapted to swing the arms 508 counterclockwise (FIG. 2), thereby to move the stop shoulders 506 out of the paths of lugs 504. Shoulders 514 thus serve to limit the upward movement of the members 486 to a position such that the red band of the ribbon 100 is in alignment with the printing line. It will be understood that this ribbon shifting mechanism is duplicated on the left-hand side of the machine.

The stop pin carriage 46 is provided with a zero stop plate 516 suitably pivoted at 518, this plate being effective to prevent rearward movement of the actuators 48 to the left of the first significant figure in normal adding and subtracting operations. During total taking operations this stop plate must be raised to permit rearward movement of the actuators. To accomplish this purpose an electromagnet 520 (FIG. 1) is provided. The armature 522 of this magnet is provided with a flexible spring support 524 and has riveted thereto an arm 526 which extends to a position beneath the stop portion 528 of the plate 516. When the electromagnet 520 is energized, the arm 526 raises the stop portion 528 of plate 516 above the plane of the actuator stop portions 50.

Means are provided to prevent bouncing of the type carriers 76 (FIG. 1). This means comprises saw teeth 530 formed at the lower ends of levers 54 which are adapted to be engaged by a comb spring 532 riveted to bail arms 536 having a cross bar 538 connecting them. One of the arms 536 has a sidewardly projecting stud 540 thereon for engagement with a notch 542 in an arm 544 pivoted on a stud 546. A bellcrank 548 is also pivoted on the stud 546. The upwardly extending arms of bellcrank 548 are adapted to be engaged by a stud 550 carried by one of the arms 552 which carry the aligning or rectifier bar 142. The bail arms 536 are normally biased for counterclockwise movement (FIG. 1) by a spring 554 tensioned between studs 540 and 546. An electromagnet 556 has an arm 558 overlying the end 560 of arm 544, the arm 558 being moved downwardly upon energization of the electromagnet.

The electromagnet 556 is energized during totaling and subtotaling operations, and upon energization the arm 544 is swung counterclockwise so as to permit the stud 540 to move into a notch 562 formed at the forward end of the bellcrank lever 548. Thereafter, upon movement of the arms 552 to cause the aligner bar 142 to move in the spaces between the teeth 144, the stud 550 engages the upwardly extending arm of the bellcrank lever 548 and swings the latter clockwise a sufficient distance to permit the stud 540 to engage in a second notch 564 at the forward end of the bellcrank levers 548. Thus the bail arms 536 swing rearwardly and cause the teeth of the comb spring 532 to engage the teeth 530 and thus act as a ratchet pawl to prevent rebound of the type carriers.

Near the completion of an operating cycle, the restoring bail rod 62 engages rearwardly extending portions 566 of the bail arms 536 and swings these arms clockwise to the position shown in FIG. 1, whereupon the bellcranks 548 and arms 544 are returned to the position shown in FIG. 1 by a spring 568.

CREDIT BALANCE SWITCHES

The calculating machine is equipped with a credit balance or overdraft mechanism of the type shown in said prior Patent No. 2,550,581. This mechanism includes a bail comprising a cross piece 570 (FIG. 1) and arms 572. This bail is moved to counterclockwise whenever the associated accumulator contains a credit balance. An arm 574 of insulating material (FIG. 22) is secured to bail 570, 572 to oscillate therewith and carries two pairs of switch bridging contacts 576—577 and 578—579, which are respectively cooperable with fixed contacts 580—581—582, and 584—585. Both the No. 1 and No. 2 accumulators have their overdraft mechanisms connected to similar switching mechanism, as best shown in FIG. 26, it being understood that the insulating arm 574 carries a contactor 576—577 which may bridge either between contacts 580 and 582 or between fixed contacts 581 and 582, and that the contactor 578—579, when the accumulator contains a credit balance, makes a connection between fixed contacts 584 and 585.

Means are provided to prevent effective operation of the total and subtotal keys 152 to 155 whenever the pin carriage 46 is displaced from its normal position. This means comprises a switch 590 (FIG. 1) which is engaged by part of the frame of the pin carriage 46 and held closed whenever the pin carriage is in its home or normal position.

OPERATION

The operation of the machine is as follows:

The amounts to be added or subtracted are entered in the usual manner by operation of the keys 40 to set the amount in the pin carriage 46, and one of the keys 146 to 151 is depressed to determine into which accumulator the amount shall be added or from which it shall be subtracted. Depression of one of the latter keys results in completion of an M circuit which results in energization of a motor trip electromagnet 592 (FIG. 26) through a circuit including the M conductor, a conductor 594, a rectifier 596, current limiting resistor 598, and the return conductor R. A resistor 600 and capacitor 602 are connected between the return conductor R and the conductor 594, to complete the circuit for the direct current power supply.

The motor trip magnet 592 operates a double pole double throw switch 603 to complete a circuit through the series motor M from the 115 volt A.C. source to which a plug 604 is connected. Energization of the motor trip electromagnet 592 results in engaging a one revolution clutch mechanism of conventional construction such, for example, as shown in Mehan et al. Patent No. 2,396,188. As the machine approaches completion of a cycle the one revolution clutch mechanism is disengaged and at the same time the switch 603 is restored to the position in which it is shown in FIG. 26.

Adding in accumulator No. 1

Assuming the key 146 was depressed, it also causes completion of the circuits for the 4, 6, and 8 electromagnets, the circuit for the 6 electromagnet being completed through a double rectifier 608.

Energization of the arm 280–4 of electromagnet 4 swings arm 396 downwardly to bring its end hook portion in front of stud 398 on lever 399 (FIGS. 17 and 23) so that the parts are conditioned to shift the No. 1 accumulator forwardly to the add position. Energization of electromagnet 6, by its arm 280–6 (FIG. 17) swings lever 324 downwardly to cause the notch 326 therein to engage stud 328. (In FIG. 23 the arm 396 is shown as being hooked over the stud 398 in the showing of the No. 2 accumulator.) Thus, at the completion of about the first half cycle, the roller 383 (FIG. 25) engages the hook portion of the link 386 and swings the plate 338 clockwise and moves the slide 334 and hook arm 324 rearwardly, thereby to cause the cam plates 316 to swing counterclockwise and cause the No. 1 accumulator pinions to be engaged with their gear segments 93. The No. 2 accumulator is not engaged because the electromagnet 3 is not energized. Thus its arm 324 does not engage the stud 328 for the No. 2 accumulator.

Energization of the electromagnet 8 through its arm 280–8 (FIG. 19) swings the arms 340 and 346 apart so that they are not engaged by their rollers 342 and 350 respectively. The machine thus operates through a cycle during which the amount set up in the keyboard is added into the No. 1 accumulator.

Adding in accumulator No. 2

In a similar manner, depression of the key 147 (for addition in the No. 2 accumulator) results in energization of the motor M and electromagnets 1, 3, and 8. The circuits for the electromagnets 1 and 8 are completed directly by the switches closed by the key 147, whereas the circuit for electromagnet 3 is completed through a double rectifier 610. Energization of electromagnet 1 through its arm 280–1 depresses the lever 396 for the No. 2 accumulator so as to bring its forward hook portion over stud 398. Energization of the electromagnet 3 through its arm 280–3 operates in the same manner as electromagnet 6 to provide an effective drive to cause engagement and disengagement of the No. 2 accumulator.

Of course, depression of the key 147 also results in completing a circuit through the motor trip electromagnet 592 and releases the one revolution clutch mechanism for operation. In fact, it may here be stated that depression of any one of the keys 146 to 156 results in energization of the motor M as previously described.

It will be recalled that the key operated switches for energizing the motor are initially spaced farther apart than the remaining switches operated by the key, and that to close the motor operated switches the keys must be depressed a short distance further than necessary to cause their lugs 182 (FIG. 8) to latch beneath the lugs 184 on the key locking slides 186. Thus, the motor control switch is energized but for an instant, while the key is depressed beyond its latching position, and when the operator releases the key it is latched in such position by the key latch mechanism just mentioned, that the motor switch will be open while the other switches operated by the key remain closed. The reason for this temporary energization of the motor control circuit is so that upon completion of the cycle the motor trip magnet will have been deenergized and thus prevent recycling of the machine.

Adding in accumulators No. 1 and No. 2

Depression of the key 150 results in the energization of electromagnets 1, 3, 4, 6, and 8, as well as the motor trip electromagnet 592, and the machine cycle will be the same as a combniation of the two cycles previously described, the amount entered in the stop pin carriage 46 being added in both accumulators.

Subtracting in accumulator No. 1

Depression of the key 148 will result in a cycle similar to that which resulted from depression of key 146, except that electromagnet 5 will be energized instead of magnet 4. Energization of electromagnet 5 causes its arm 280–5 to move downwardly (FIG. 17) and causes its shoulder portion 430 to lie in alignment with and behind stud 422 so that, upon rocking of the plate 420 by the hook link 412, the arms 392 will be swung rearwardly so as to move the No. 1 accumulator frame rearwardly and bring its subtract pinions 299 into position for engagement with the gear segments 93. The closure of the switch for the No. 5 electromagnet also results, by virtue of its connection to the rectifier 608, in energization of electromagnet 6, and this operates through its arm 280–6 to swing the arm 324 downwardly so that its notch 326 engages stud 328. This provides a connection for operating the cam plates 316 to enmesh the No. 1 accumulator pinions 299 with their associated gear segments 93.

Subtracting in accumulator No. 2

Depression of the control key 149 results in completing the circuits for the electromagnets 2, 3, and 8, and results in causing the No. 2 accumulator to be shifted rearwardly to subtract position and to be engaged during the return stroke in a manner similar to that described with reference to the subtract operation in the No. 1 accumulator controlled by the depression of key 148.

Subtracting in accumulators No. 1 and No. 2

In a similar manner, depression of the key 151 results in energization of the 2, 3, 5, 6, and 8 electromagnets.

Nonadd cycle

Depression of the nonadd key 156 results in energization of the motor and the No. 8 electromagnet. The arm 280–8 of the latter (FIGS. 18 and 19) spreads apart the arms 340 and 346 so that neither of the accumulators is engaged on either the forward or the return stroke of the operating cycle.

Clear keyboard interlock

It will be noted from the wiring diagram of FIG. 26 that the depression of the control keys 152 to 155 is in-

Total from accumulator No. 1

Depression of the control key 152 results in the energization of electromagnets 7 and 556. If the No. 1 accumulator contains a credit or negative balance, the switch arms 576 and 577, respectively, bridge contacts 581, 582 to energize electromagnets 5 and 6, thereby causing the total to be taken from the No. 1 accumulator when the latter is in credit balance condition.

Through an additional contact under the key 152 (the lowermost switch) current is supplied to contact 585 and connected to contact 584 by the bringing contactors 578—579, thus supplying current to ribbon color control electromagnets 512 which operate the ribbon guiding means to position the ribbon for printing red, and through solenoid 612 conditions the symbol printing mechanism to print the credit balance symbol, such as "CR."

The depression of key 152 also results in completion of a circuit to electromagnet 4 if the No. 1 accumulator contains a positive balance, this circuit being traced as follows: From the switch contact 541 completed by key 152, through contacts 582, switch arms 576, 577, contact 580, to electromagnet 4, and through rectifier 608 to electromagnet 6. Electromagnets 7 and 556 are also energized. The energization of electromagnet 7 causes its arm 280–7 (FIG. 25) to be raised, thereby raising hook arm 386 with the result that the accumulators are engaged. This is because of the engagement of the roller 350 (FIG. 25) with the hook portion 338 of hook 346. The latter operates through slide 334 and studs 328 to swing the cam arm 316 (FIG. 17) rearwardly and cause the No. 1 accumulator pinions 299 to be brought into engagement with their gear segments shortly after the commencement of the cycle. At the completion of the forward stroke portion of the cycle the stud 342 (FIG. 25) engages the end of link 340, thereby moving the slide 334 forwardly and swinging the cam plate 316 clockwise, thereby to disengage the accumulator pinions.

Subtotal from accumulator No. 1

Depression of the subtotal key 154 for the No. 1 accumulator completes all of the circuits which are completed by the operation of the key 152, and in addition closes a switch to complete a circuit to electromagnet 9. The energization of this electromagnet through its arm 280–9 (FIGS. 18, 19, and 21) moves the links 374 and 340 downwardly so that the end of the link 340 is out of the path of the roller 342. As a result, the No. 1 accumulator stays in mesh until near the end of the stroke when roller 382 strikes the end of link 384 (FIGS. 21 and 25) to move the No. 1 accumulator out of mesh.

Total and subtotal from accumulator No. 2

Depression of control keys 153 and 155 results in operations the same as those accomplished by depression of keys 152 and 154 respectively, except that they control the No. 2 accumulator instead of accumulator No. 1.

It will be noted that when any one of the keys 152 to 155 is operated, the electromagnet 556 is energized, and that the energization of this electromagnet, as shown in FIG. 1, permits the bail arms 536 to swing rearwardly to bring the comb spring 532 into operative engagement with the saw teeth 530, thereby to prevent rebound of the type carriers 76.

From the foregoing it will appear that by the provision of the various electromagnets energized in various combinations by the control keys, the control mechanism and interlocks are greatly simplified. For example, the single switch 590 operates as effectively as an interlock to prevent effective operation of the four total and subtotal control keys 152 to 155. To perform the function of this single switch, a relatively large number of mechanical interlocks would be required. Similarly, the switch arms 576, 577, and arms 578, 579, by their position, depending upon whether a negative or positive balance is present in the accumulator, perform a variety of functions which could otherwise be accomplished only by a complicated series of mechanisms.

The fact that the switches controlling the starting of the motor and the engagement of the one revolution clutch mechanism are closed subsequent to the closure of the remaining function control switches, and the fact that there is lost motion between the studs 244 and the notches 253 (FIGS. 8 and 9) makes it necessary that the switches, other than the motor control switch, are closed first. This is determined by the fact that the motor control switch is not closed until after the stud 192 on the particular key depressed is positioned between the adjacent gate locks 190. Thus, if following depression of one of the control keys 146 to 156, pressure is applied to another one of these keys, the latter key will be locked against downward movement by the engagement of its stud 192 with the adjacent gate locks 190, and it would be held against further depression until the first depressed key has been returned to a position such that its stud 192 no longer effectively engaged the gate locks 190 and at this time such key will have already opened its motor controlling switch. The U-shaped spring 256 (FIGS. 12 and 13) is effective to open the switch contacts even before the auxiliary key stem 170 has moved to a position out of contact with the gate locks 190.

As indicated in FIGS. 10 to 12, the connections to the various bus bars on the insulating panels 224, 225, 226 are made by wires assembled into cables terminating in sockets which may conveniently be connected with complementary pronged connectors so that the control unit as a whole may be readily removed from the machine, and if desired, placed at some distance therefrom.

Similarly, the invention may be employed with advantage in the control of bookkeeping and the like machines, in which the character of the cycle to be performed by the machine is predetermined by the columnar position of the carriage. In such applications of the invention, switches in parallel with the key operated switches, or substituted therefor, and operated by the setting of the carriage in a certain position would select the functional cycle to be performed. Also, the control of the machine function by electromechanical means of the kind disclosed herein is well adapted for use in systems employing a number of machines controlled from a single keyboard.

One of the important features of the invention resides in its adaptability to adding and calculating machines. For example, the credit balance mechanism disclosed in Mehan Patent No. 2,550,581 may readily be adapted, by the addition of insulating plates 574, together with their bridging contactors 576, 577, 578—579, to be employed to change the functional cycle of the machine, depending upon whether the balance in the selected accumulator is positive or negative. The character of the cycle of machine operation is therefore conditioned by the presence or absence of an overdraft or credit balance in the particular accumulator selected for a totaling or subtotaling operation, and the functional cycle of the machine is simply indicated by the ribbon color control solenoids 512 or electromagnets, as well as by the presence or absence of the credit balance indicating symbol (CR) on the record tape, controlled by solenoid 612.

In the circuit diagram of FIG. 26, the functions controlled by the keys 146—155 is indicated by suitable abbreviated legends, such as (+1), indicating an addition cycle into the accumulator No. 1, etc., total, subtotal, and nonadd being appropriately indicated by (T), (ST), and (NA), followed by the number of the accumulator from which the total and subtotal, respectively, are to be taken. The individual conductors are, for reasons of clarity, not identified by reference characters in FIG.

26, but it will be clear to one skilled in the art that the circuits are simple direct current circuits (except for the motor current supply circuits).

The fact that all of the total and subtotal control circuits are rendered ineffective when the keyboard interlock switch 90 is open, provides for reliability in operation, prevents misoperation, and undesired, possibly "jamming," operations, and also prevents the printing of incorrect totals and subtotals. The simplification of the electromechanical controls made possible by the utilization of this invention is of considerable importance in providing flexibility in operation of the machine, as well as a substantial reduction in cost as compared with purely mechanical devices and interlocks for accomplishing somewhat similar results.

While there has been shown and described a preferred embodiment of the invention, it will be apparent that numerous variations and modifications thereof may be made without departing from the underlying principles of the invention. It is intended, therefore, by the following claims to include within the scope of the invention all such variations and modifications by which substantially the results of the invention may be obtained through the use of substantially the same or equivalent means.

The invention claimed is:

1. In an electric motor operated calculating machine provided with amount setup mechanism, actuators controlled thereby and at least one accumulator being capable of operation by the actuators, a general operator, the combination of a plurality of function control devices effective upon operation to determine the character of the cycle of operation to be performed and to initiate such cycle, each of said control devices including a manually engageable part and a plurality of switches, at least one of said switches for each device being an electric motor control switch operative to control the initiation of a cycle of operation, said motor control switch being closed momentarily upon operation of the corresponding manually engageable part and opened upon the manual release of the part, means to latch the manually engageable part in an intermediate position to hold the switch, other than the motor control switch, in operated condition after the manual release of the part, mechanical means operated by the general operator for controlling the positioning of the accumulator with respect to the actuators to determine whether an adding or subtracting operation shall be performed, additional mechanical control means operated by the general operator to determine the portion of a cycle during which the accumulator shall be enmeshed with the actuators, and electromagnetic means connected to and operated under the control of preselected switches of said function control devices, other than said motor control switch, to condition said mechanical means and said additional mechanical control means to determine the character of the operating cycle of the machine in response to the particular function control device selected for operation.

2. In an electric motor operated calculating machine, the combination of a pin carriage having stop pins therein arranged in denominational orders, actuators cooperable with said orders of stop pins, a plurality of accumulators engageable with said actuators for operation thereby, a zero stop device associated with said carriage normally to prevent excursion of actuators for denominational orders higher than the highest denominational order in which a pin is set in said carriage, a solenoid connected with said zero stop device to move the latter to an inoperative position, a general operator, a plurality of function control devices effective upon operation to initiate an operating cycle and determine the character of the cycle, each of said control devices including a manually engageable part and a plurality of switches operated thereby, at least one of said switches for each device being a motor control switch operative to initiate an operating cycle, and being closed momentarily upon operation of the corresponding manually engageable part and opened upon manual release of the part, means for latching each manually engageable part in operated position to hold in operated condition the switches operated thereby, other than said motor control switch, mechanical means operated by said general operator for controlling the positioning of said accumulators with respect to said actuators to effect adding and subtracting operations, additional mechanical control means operated by the general operator to determine the portion of a cycle during which each accumulator shall be enmeshed with said actuators, total and subtotaling means connected for operation by said general operator, said function control device including devices for determining totaling and subtotaling operations; electromagnetic means connected to and operated by selected switches of said control devices, other than said motor control switch, to condition said mechanical means, said additional mechanical means and said totaling and subtotaling means to determine the character of the operating cycle of the machine in response to the particular function control device selected for operation; and means connecting switches of said totaling and subtotaling function control devices to said zero stop solenoid to energize the latter and release all said actuators from said zero stop device upon operation of one of said totaling and subtotaling function control devices.

References Cited in the file of this patent

UNITED STATES PATENTS

| | | |
|---|---|---|
| 1,669,996 | Naumann | May 15, 1928 |
| 2,142,862 | Skeen | Jan. 3, 1939 |
| 2,195,606 | Toggenburger | Apr. 2, 1940 |
| 2,222,373 | Rauh | Nov. 19, 1940 |
| 2,224,203 | Turck et al. | Dec. 10, 1940 |
| 2,228,830 | Kniehahn | Jan. 14, 1941 |
| 2,293,127 | Fishack et al. | Aug. 18, 1942 |
| 2,309,901 | Hogfors | Feb. 2, 1943 |
| 2,343,273 | Avery | Mar. 7, 1944 |
| 2,396,188 | Mehan et al. | Mar. 5, 1946 |
| 2,414,307 | Johnson | Jan. 14, 1947 |
| 2,451,090 | Johnson | Oct. 12, 1948 |
| 2,497,784 | Mehan et al. | Feb. 14, 1950 |
| 2,523,768 | Knutsen | Sept. 26, 1950 |
| 2,545,649 | Capellaro | Mar. 20, 1951 |
| 2,665,844 | Westinger et al. | Jan. 12, 1954 |
| 2,666,574 | Carlson et al. | Jan. 19, 1954 |
| 2,675,960 | Frieberg et al. | Apr. 20, 1954 |
| 2,695,134 | Sundstrand | Nov. 23, 1954 |
| 2,744,681 | Hall et al. | May 8, 1956 |
| 2,753,111 | Tancred | July 3, 1956 |